(12) United States Patent
Faruquee et al.

(10) Patent No.: US 11,592,221 B2
(45) Date of Patent: Feb. 28, 2023

(54) TWO-PHASE COOLING SYSTEM

(71) Applicant: DEERE & COMPANY, Moline, IL (US)

(72) Inventors: Zakir H. Faruquee, Asbury, IA (US); Steven R. Whiteman, Asbury, IA (US); Steven R. Sass, Dubuque, IA (US); Brian D. Spangler, Dubuque, IA (US); Colton K. Leal, Dubuque, IA (US)

(73) Assignee: Deere & Company, Moline, IL (US)

( * ) Notice: Subject to any disclaimer, the term of this patent is extended or adjusted under 35 U.S.C. 154(b) by 199 days.

(21) Appl. No.: 17/247,749

(22) Filed: Dec. 22, 2020

(65) Prior Publication Data

US 2022/0196300 A1 Jun. 23, 2022

(51) Int. Cl.
*F25B 39/02* (2006.01)
*F25B 13/00* (2006.01)

(52) U.S. Cl.
CPC .............. *F25B 39/02* (2013.01); *F25B 13/00* (2013.01)

(58) Field of Classification Search
CPC .. F25B 39/02; F25B 13/00; F25B 5/04; Y02T 10/70; B60H 1/00278; B60H 1/32; B60H 1/3204; B60H 1/32281
See application file for complete search history.

(56) References Cited

U.S. PATENT DOCUMENTS

| | | | |
|---|---|---|---|
| 4,367,699 A | 1/1983 | Evans | |
| 4,898,261 A | 2/1990 | Winberg et al. | |
| 5,199,387 A | 4/1993 | Ap | |
| 5,333,677 A | 8/1994 | Molivadas | |
| 5,408,836 A | 4/1995 | Sjoholm et al. | |

(Continued)

FOREIGN PATENT DOCUMENTS

| | | |
|---|---|---|
| DE | 68924005 T2 | 3/1996 |
| DE | 10128164 A1 | 12/2002 |

(Continued)

OTHER PUBLICATIONS

Attached pdf is translation of foreign reference WO 2020213537 A1 (Year: 2020).*

(Continued)

*Primary Examiner* — Len Tran
*Assistant Examiner* — Kamran Tavakoldavani (57) ABSTRACT

A two-phase cooling system of an electric work vehicle includes a compressor, a condenser, a thermal expansion valve, a heat exchanger, and an evaporator. The compressor compresses a refrigerant to increase the refrigerant pressure. The condenser is downstream of the compressor and discharges heat from the refrigerant flowing from the compressor to condense at least a portion of the refrigerant. The thermal expansion valve is downstream of the condenser and decreases the pressure of the refrigerant to vaporize the refrigerant to decrease the temperature of the refrigerant. The heat exchanger is coupled to an electrical component and is used to transfer heat from the electrical component to the refrigerant from the electrical component. The refrigerant then flows through the evaporator, where it absorbs more heat. The refrigerant passes back through the thermal expansion valve on its return to the compressor.

16 Claims, 5 Drawing Sheets

(56) References Cited

U.S. PATENT DOCUMENTS

| | | | |
|---|---|---|---|
| 5,408,965 | A | 4/1995 | Fulton et al. |
| 5,535,711 | A | 7/1996 | Kach |
| 5,692,387 | A | 12/1997 | Alsenz et al. |
| 6,053,131 | A | 4/2000 | Mueller et al. |
| 6,067,804 | A | 5/2000 | Moeykens et al. |
| 6,145,332 | A | 11/2000 | Hyde |
| 6,170,286 | B1 | 1/2001 | Keuper |
| 6,250,086 | B1 | 6/2001 | Cho et al. |
| 6,293,108 | B1 | 9/2001 | Cho et al. |
| 8,288,048 | B2 | 10/2012 | Thompson |
| 8,839,894 | B2 | 9/2014 | Yokoyama et al. |
| 9,000,724 | B2 | 4/2015 | Minami |
| 9,826,666 | B2 | 11/2017 | France et al. |
| 2002/0040896 | A1 | 4/2002 | Ap |
| 2002/0050149 | A1 | 5/2002 | Kawada |
| 2003/0079485 | A1 | 5/2003 | Nakata |
| 2004/0177827 | A1 | 9/2004 | Hoyte et al. |
| 2005/0247072 | A1 | 11/2005 | Narayanamurthy et al. |
| 2006/0242992 | A1 | 11/2006 | Nicodemus |
| 2007/0074535 | A1 | 4/2007 | Holdsworth |
| 2007/0101760 | A1 | 5/2007 | Bergander |
| 2007/0130989 | A1 | 6/2007 | Tsuboi et al. |
| 2007/0295475 | A1 | 12/2007 | Sarnie et al. |
| 2009/0014156 | A1 | 1/2009 | Vetrovec |
| 2009/0133412 | A1 | 5/2009 | Narayanamurthy et al. |
| 2009/0205350 | A1 | 8/2009 | Takahashi et al. |
| 2010/0147254 | A1 | 6/2010 | England et al. |
| 2010/0205959 | A1 | 8/2010 | Kasuya et al. |
| 2010/0282203 | A1 | 11/2010 | Jessberger et al. |
| 2011/0111920 | A1 | 5/2011 | Gooden et al. |
| 2012/0048504 | A1 | 3/2012 | Park et al. |
| 2013/0174589 | A1 | 7/2013 | Wightman |
| 2014/0331693 | A1 | 11/2014 | Meitinger et al. |
| 2014/0331701 | A1 | 11/2014 | James |
| 2014/0374081 | A1 | 12/2014 | Kakehashi et al. |
| 2016/0025391 | A1 | 1/2016 | Weng et al. |
| 2016/0178257 | A1 | 6/2016 | Liebendorfer et al. |
| 2016/0265598 | A1 | 9/2016 | Kruger et al. |
| 2016/0290189 | A1 | 10/2016 | Nakazono et al. |
| 2016/0290683 | A1 | 10/2016 | Mahmoud et al. |
| 2016/0326914 | A1 | 11/2016 | Bagayatkar |
| 2016/0344075 | A1 | 11/2016 | Blatchley et al. |
| 2017/0051821 | A1 | 2/2017 | Long et al. |
| 2017/0176065 | A1 | 6/2017 | Kuroda et al. |
| 2017/0205128 | A1 | 7/2017 | Onaka et al. |
| 2017/0361698 | A1 | 12/2017 | Hussain |
| 2018/0073752 | A1 | 3/2018 | Cho |
| 2018/0087452 | A1 | 3/2018 | Bidner et al. |
| 2018/0118014 | A1 | 5/2018 | Wantschik |
| 2018/0194196 | A1 | 7/2018 | Shepard et al. |
| 2018/0209744 | A1 | 7/2018 | Cho |
| 2018/0231329 | A1 | 8/2018 | Adamson et al. |
| 2020/0309467 | A1 | 10/2020 | Whiteman et al. |
| 2021/0178859 | A1* | 6/2021 | Bellino ............. B60H 1/00385 |

FOREIGN PATENT DOCUMENTS

| | | | |
|---|---|---|---|
| DE | 102005048241 A1 | 4/2007 | |
| DE | 102007014019 A1 | 9/2008 | |
| DE | 102011108729 A1 | 1/2013 | |
| DE | 112017001216 T5 | 12/2018 | |
| EP | 2232026 B1 | 8/2012 | |
| FR | 1422955 A | 1/1966 | |
| WO | WO11149868 A1 | 12/2011 | |
| WO | WO-2020213537 A1 * | 10/2020 | ............. F25B 41/20 |

OTHER PUBLICATIONS

Pdf is translation of foreign referecne WO 2020213537 A1 (Year: 2020).*
German Search Report issued in application No. DE102021212630.8 dated Jul. 26, 2022 (10 pages).
German Search Report issued in counterpart application No. 102020204117.2 dated Nov. 19, 2020 (10 pages).
Salamon et al., Two-phase liquid cooling system for electronics, part 1: Pump-driven loop, dated May 30-Jun. 2, 2017, DOI: 10.1109/ITHERM.2017.7992551, 2017 16th IEEE Intersociety Conference on Thermal and Thermomechanical Phenomena in Electronic Systems (ITherm).
Pumped Two Phase Cooling, dated Feb. 27, 2019, 22 pages, Advanced Cooling Technologies.

* cited by examiner

FIG. 5

TWO-PHASE COOLING SYSTEM

RELATED APPLICATIONS

N/A

FIELD OF THE DISCLOSURE

The present disclosure relates generally to a cooling system applied to an electric work vehicle.

BACKGROUND OF THE DISCLOSURE

The off-highway vehicle may include a mechanical driveline system, an electrical driveline system, or a hybrid system. During the operation of the vehicle, heat is created during the combustion, battery discharge, hydraulic operation, etc. Normally heat is usually extracted from engines, hydraulics, transmissions, and electric machines by circulating a fluid such as water through them. This fluid then discharges heat energy from above-mentioned elements, via a cooler, for example a radiator, to the surrounding air. This is a conventional single-phase system. However, such heat discharge may be limited by the ambient temperature. For example, when the ambient temperature is 30 degrees Celsius, the temperature of the elements may not fall below 30 degrees Celsius.

SUMMARY OF THE DISCLOSURE

According to an aspect of the present disclosure, a two-phase cooling system of an electric work vehicle includes a compressor, a condenser, a first thermal expansion valve, and a heat exchanger. The compressor is operable to compress a refrigerant in vapor form to increase a pressure of the refrigerant. The condenser is downstream of the compressor and is operable to discharge a heat from the refrigerant flowing from the compressor to condense the refrigerant. The first thermal expansion valve is downstream from the condenser and is operable to decrease the pressure of the refrigerant to vaporize the refrigerant from liquid form to vapor form to decrease the temperature of the refrigerant. The heat exchanger is coupled to an electrical component to transfer a heat from the electrical component to the refrigerant.

According to an aspect of the present disclosure, a method of cooling a heat exchanger of a two-phase cooling system, comprising: compressing a refrigerant in vapor form to increase a pressure via a compressor; discharging of a heat from the refrigerant flowing from the compressor to liquidize at least a portion of the refrigerant via a condenser; decreasing the pressure of the refrigerant to vaporize the refrigerant from liquid form to vapor form and decrease the temperature of the refrigerant via a thermal expansion valve; and dissipating a heat of an electrical component of an electric work vehicle to the refrigerant flowing from the thermal expansion valve via a heat exchanger.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

The present disclosure includes a two-phase cooling system to cool electrical components of an electric work vehicle.

Figure 1:
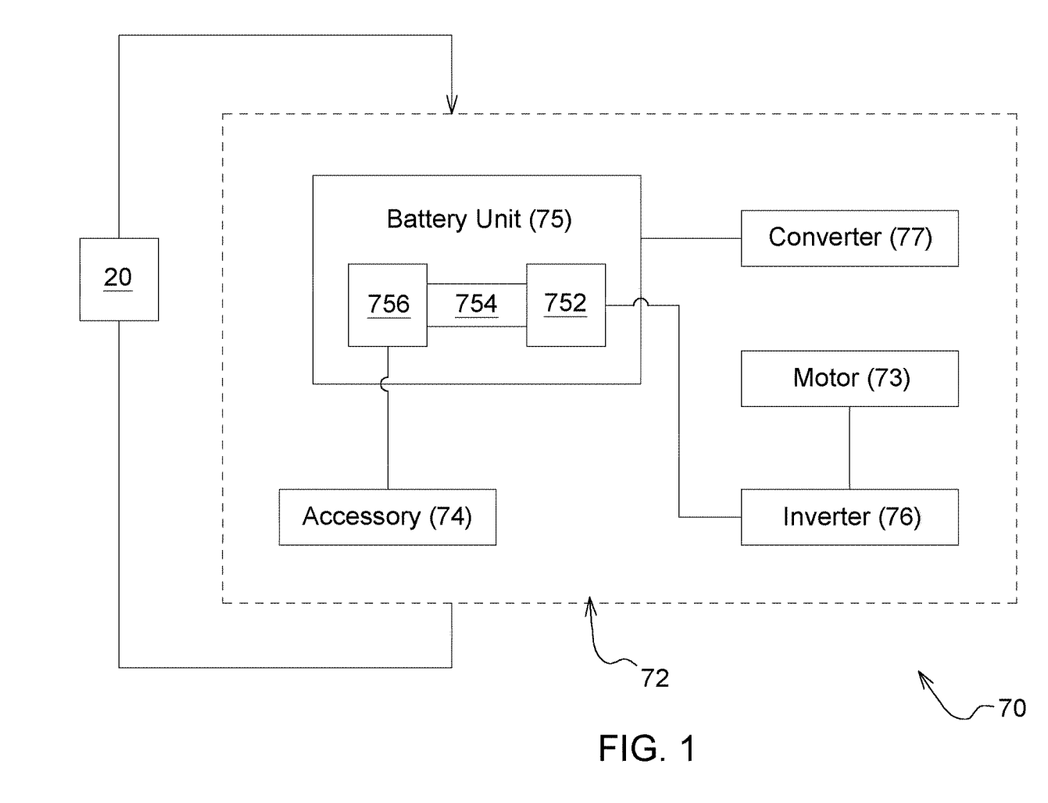
FIG. 1 is a schematic view illustrating an electric work vehicle with electrical components and a heat exchanger.

Referring to FIG. 1, an electric work vehicle 70 has electrical components 72, which may include but is not limited to a motor 73, an accessory 74, a battery unit 75, an inverter 76, and a converter 77. The battery unit 75 may include a traction battery pack 752, a DC converter 754, and auxiliary battery pack 756. When the traction battery pack 752 discharges, the inverter 76 changes the high voltage direct current to alternating current so as to drive the motor 73. The DC converter 754 lowers the high voltage direct current from the traction battery pack 752. The auxiliary battery pack 756 stores electrical energy from the DC converter 754 and is able to provide low voltage direct current to power the accessory 74. The converter 77 takes the alternating current electricity and converts it to direct current electricity to be stored in the traction battery pack 752 of the battery unit 75. With the flowing of electricity, the temperature of the electrical components 72 increases.

Figure 2:
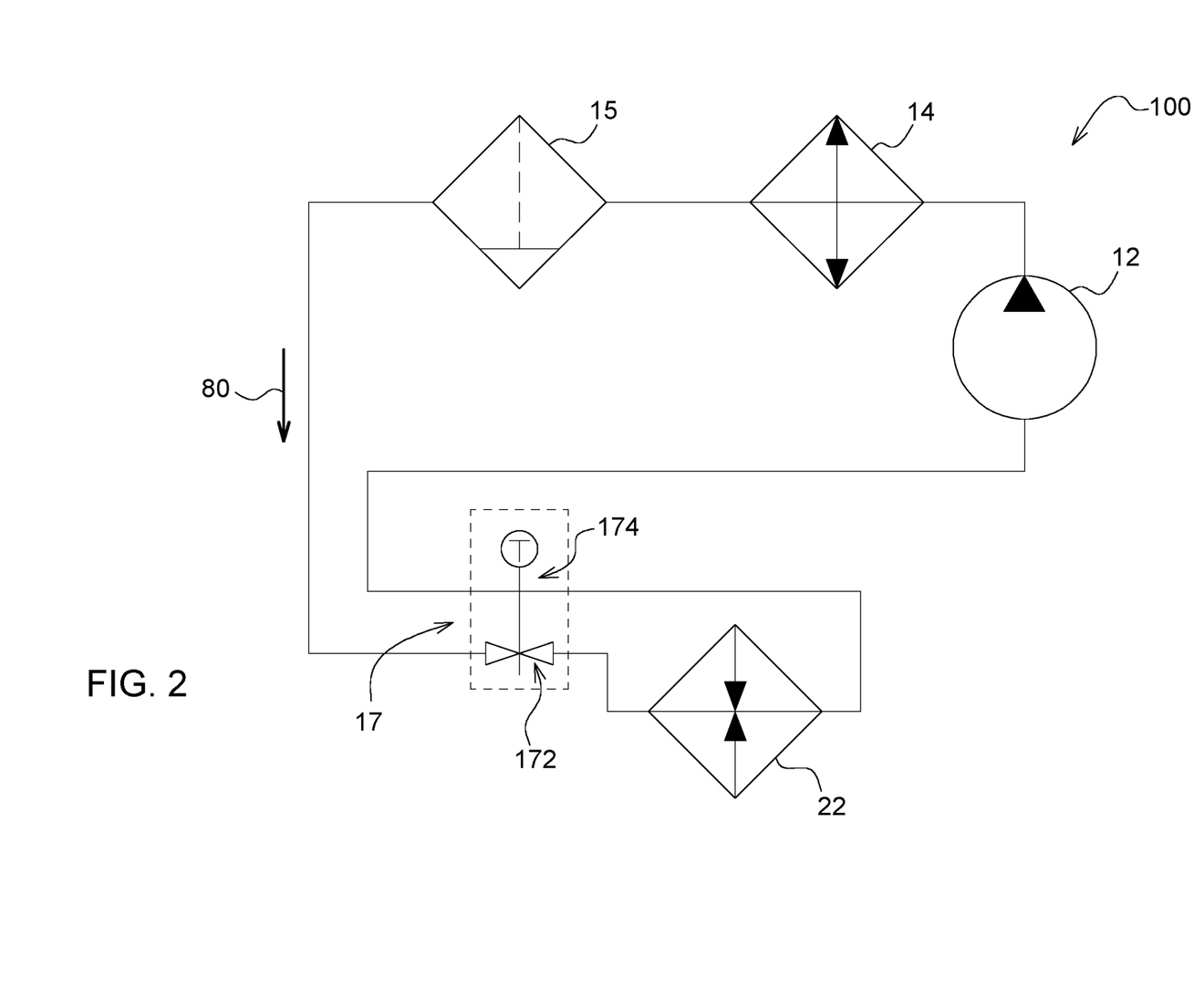
FIG. 2 is a schematic view for a two-phase cooling system.

Referring to FIG. 2, a two-phase cooling system 100 is provided. The two-phase cooling system includes a compressor 12, a condenser 14, a drier receiver 15, a thermal expansion valve 17, and an evaporator 22.

The compressor 12 is included to circulate a refrigerant 80 by imparting energy to the refrigerant flow. When the refrigerant 80 reaches the compressor 12, the compressor 12 compresses the refrigerant 80, such that the refrigerant 80 between the compressor 12 and the condenser 14 is at a high pressure and high temperature (maybe superheated).

The refrigerant 80 then enters the condenser 14 where it discharges heat to the atmosphere. The condenser 14 is downstream of the compressor 12 and is operable to discharge heat from the refrigerant flowing from the compressor 12 to condense the refrigerant 80 into a liquid. Air from the atmosphere is driven through the condenser 14 to absorb the heat load. The refrigerant 80 exiting the condenser 14 may be saturated or subcooled liquid for smooth operation of the thermal expansion valve 17 downstream from the condenser 14. In a path between the condenser 14 and the thermal expansion valve 17, the refrigerant 80 is still at a high pressure.

Optionally, a drier receiver 15 may be included in a path between the condenser 14 and the thermal expansion valve 17. The drier receiver 15 is available to temporarily store some of the refrigerant 80, which may not be needed for the current operation. The drier receiver 15 also has desiccant inside to absorb the moisture from the refrigerant 80. The drier receiver 15 shown in the two-phase cooling system 100 may also be optionally disposed downstream from the condenser 14 in a two-phase cooling system 200 or 300.

The refrigerant 80 then passes through a thermal expansion valve 17 from the condenser 14 or the drier receiver 15. It is noted that in this implementation, the thermal expansion valve 17 includes a pressure drop port 172 and sensing port 174. In the pressure drop port 172 of the thermal expansion valve 17, the pressure of the refrigerant 80 drastically decreases. In a path between the thermal expansion valve 17 and the evaporator 22, the refrigerant 80 is at a lower pressure. The refrigerant 80 in liquid form that changes into vapor form requires latent heat (energy potential), and the temperature of the refrigerant 80 will drop. The refrigerant 80 flows from the condenser 14 and/or drier receiver 15, through the pressure drop port 172 of the thermal expansion valve 17, to the evaporator 22 with low pressure and low temperature.

The evaporator 22, which the refrigerant 80 passes through, is operable to absorb heat from a body of air. The evaporator 22 may cool the cabin air, for example. A fan (not shown) adjacent to the evaporator 22 provides airflow that passes through the evaporator 22 to the cabin. Heat is rejected from the airflow to the refrigerant 80 due to its lower temperature (than cabin air) and/or its change from liquid form to vapor form requiring latent heat (energy potential). Again, the refrigerant 80 is discharged from the evaporator 22 and flows into the compressor 12. It is noted that in this implementation, the refrigerant 80 flows from the evaporator 22, through the sensing port 174 of the thermal expansion valve 17, to the compressor 12. The thermal expansion valve 17 may be coupled to a thermometer to measure the temperature of the refrigerant 80 flowing through the second port 174 to manage a flow control element such as an orifice in the pressure drop port 172 of the thermal expansion valve 17. For example, if the temperature of the refrigerant 80 from the evaporator 22 is too hot, the thermal expansion valve 17 will increase the flow rate of the refrigerant 80 flowing into the evaporator 22. On the contrary, if the temperature of the refrigerant 80 from the evaporator 22 is colder than required, the thermal expansion valve 17 will decrease the flow rate of the refrigerant 80 flowing into the evaporator 22; the compressor 12 may save some energy to circulate the refrigerant 80 if the volume of the refrigerant 80 is less than the maximum limit.

The refrigerant 80 from the evaporator 22 and/or the sensing port 174 of the thermal expansion valve 17 finally flows back to the compressor 12 to be circulated.

In the two-phase cooling system 100, the compressor 12 builds pressure and the thermal expansion valve 17 is used to reduce the pressure.

Figure 3:
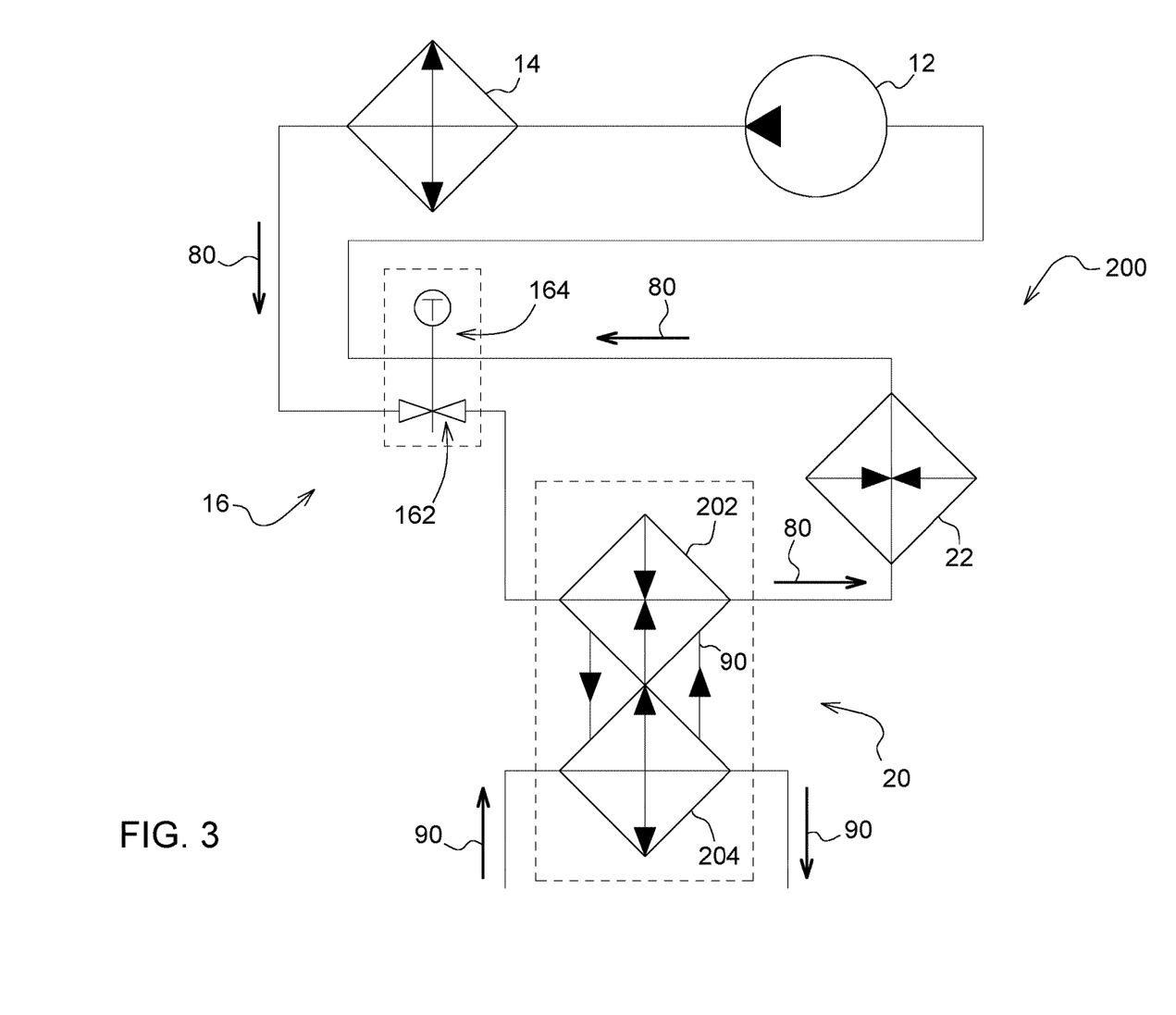
FIG. 3 is a schematic view for a two-phase cooling system that has a series arrangement.
Figure 4:
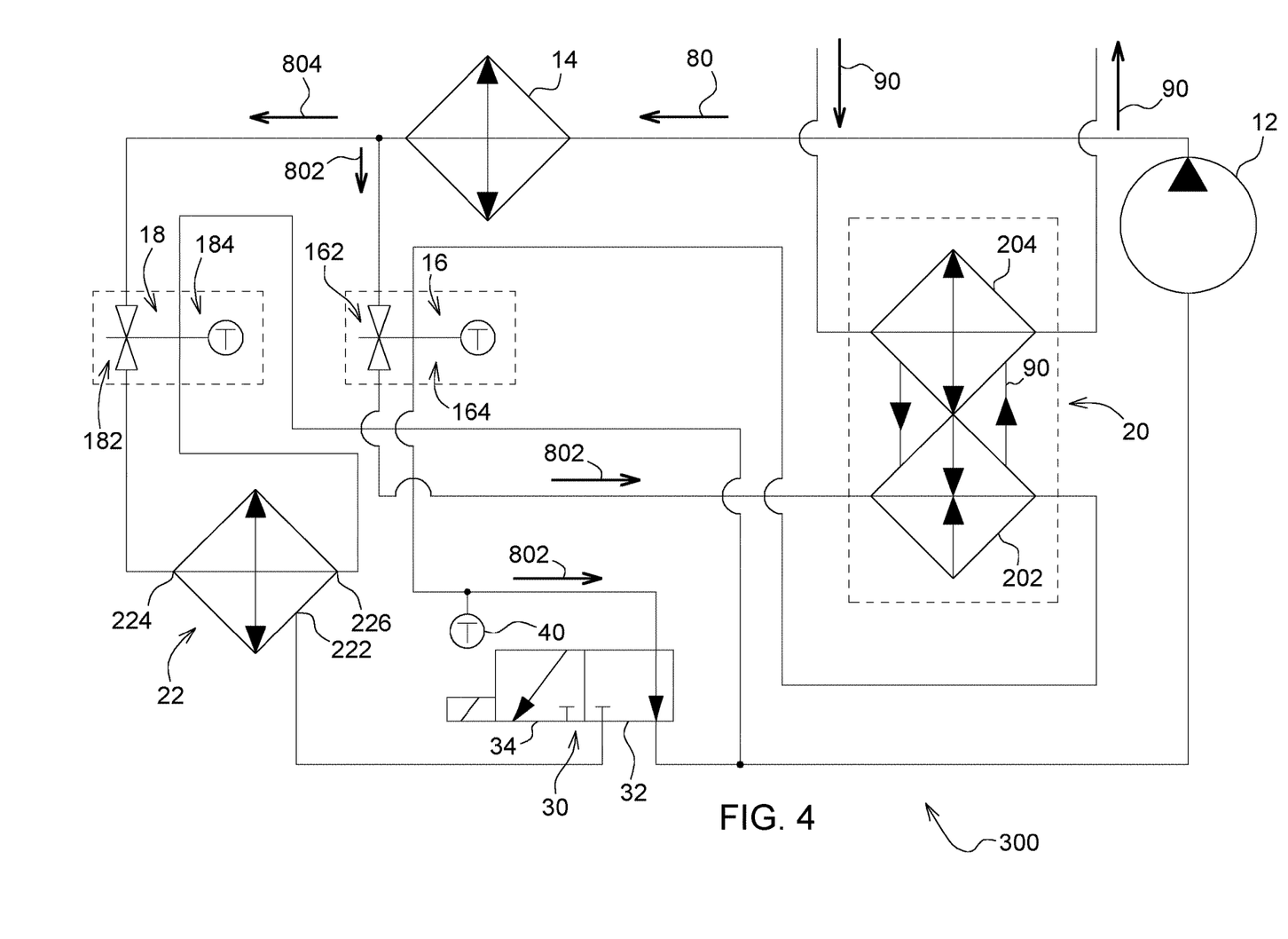
FIG. 4 is a schematic view for a two-phase cooling system that has a parallel and a parallel-series combination arrangement.

Referring to FIGS. 3 and 4, two-phase cooling systems 200, 300 are introduced. The two-phase cooling system 200 and 300 both include a heat exchanger 20 other than the evaporator 22, but the arrangements are different. The compressor 12, the condenser 14, the evaporator 22 are similar to those described in the two-phase cooling system 100, and, therefore, the detail descriptions are omitted.

Referring to FIG. 3, the two-phase cooling system 200 includes, in a series arrangement, the compressor 12, the condenser 14, a first thermal expansion valve 16, a heat exchanger 20, and the evaporator 22. The compressor 12 is operable to circulate a refrigerant 80 by increasing the refrigerant pressure. The condenser 14 is downstream of the compressor 12 and is operable to discharge a heat from the refrigerant 80 to the point that the refrigerant 80 condenses into a liquid form.

The first thermal expansion valve 16 is downstream from the condenser 14. The first thermal expansion valve 16 is operable to decrease the pressure of the refrigerant 80 to allow the refrigerant 80 in liquid form to partially vaporize. The first thermal expansion valve 16 includes a pressure drop port 162 and a sensing port 164. The refrigerant 80 flows from the condenser 14 and/or drier receiver (not shown), through the pressure drop port 162 of the first thermal expansion valve 16, to the heat exchanger 20 and evaporator 22 with low pressure and low temperature. In another implementation (not shown), the first thermal expansion valve 16 may only have the pressure drop port 162 (one port), and the refrigerant 80 from the evaporator 22 does not flow into the first thermal expansion valve 16.

The heat exchanger 20 is coupled to the electrical component 72 (shown in FIG. 1) downstream from pressure drop port 162 of the first thermal expansion valve 16. The heat exchanger 20 is tasked with transferring heat from the electrical component 72 to the refrigerant 80. The electrical components 72 may include, but is not limited to, a motor 73, an accessory 74, a battery unit 75, an inverter 76, and a converter 77. Because at least a portion of the refrigerant 80 vaporized after passing through the pressure drop port 162 of the first thermal expansion valve 16, the temperature of the refrigerant 80 decreased to a low temperature (significantly below ambient, can be negative). The sudden pressure drops of the refrigerant 80 causes it to vaporize which requires latent heat, as a consequence the temperature of the refrigerant 80 is lower at this point. The temperature of the refrigerant 80 can be controlled by setting pressure drop of the first thermal expansion valve 16. Therefore, if the ambient temperature is too high and/or the electrical components 72 need to be cooled to a temperature lower than the ambient temperature, the heat exchanger 20 will provide the necessary cooling from the cooling system 200. A coolant 90 can be used to pull heat from the electrical components and reject it via the heat exchanger 20, and then the coolant 90 returns to the electrical components 72. In this implementation, the electrical component 72 is the battery unit 75.

The heat exchanger 20 (battery cooler) includes a refrigerant path 202 and a coolant path 204. It is noted that the symbols for the condenser 14 and the coolant path 204 in FIG. 3 (and FIG. 4) look the same, which show the heat is removed from them; the symbols for the evaporator 22 and the refrigerant path 202 in FIG. 3 (and FIG. 4) look the same, which show the heat is accepted by them. The coolant 90 flows from the battery unit 75 to the coolant path 204 of the heat exchanger 20 204. The cold refrigerant 80 enters the refrigerant path 202 of the heat exchanger 20 and absorbs heat from the coolant 90. Then the coolant 90 having low temperature returns to the battery unit 75 to accept more heat. The temperature of the coolant 90 flowing back to the battery unit 75 may be lower than the ambient temperature. As shown in FIG. 3, within the heat exchanger 20, the coolant 90 and the refrigerant 80 may flow in opposite directions to reach better cooling effect.

The evaporator 22, which the refrigerant 80 passes through, is operable to absorb heat from a body of air. The refrigerant 80 is discharged by the evaporator 22 and flows into the compressor 12. The refrigerant 80 flows from the evaporator 22, through the sensing port 164 of the first thermal expansion valve 16, to the compressor 12. The first thermal expansion valve 16 may be coupled to a thermometer to measure the temperature of the refrigerant 80 flowing through the second port 164 to manage a flow control element such as orifice in the pressure drop port 162 of the first thermal expansion valve 16. The two-phase cooling system 200 has the heat exchanger 20 connected in series to the evaporator 22 and uses the refrigerant 80 to extract the heat.

Referring to FIG. 4, the two-phase cooling system 300 includes, in a parallel and parallel-series combination arrangement, the compressor 12, the condenser 14, the first thermal expansion valve 16, the heat exchanger 20, a control valve 30, the evaporator 22, and a second thermal expansion valve 18. The compressor 12 is operable to circulate a refrigerant 80 by increasing its pressure. The condenser 14 is downstream from the compressor 12 and is operable to discharge heat from the refrigerant flowing from the compressor 12, which condenses the refrigerant 80 into liquid form. The refrigerant 80 flowing from the condenser 14 is divided into a first portion 802 and a second portion 804 of the refrigerant 80. The first portion 802 of the refrigerant 80 enters the first thermal expansion valve 16 and the second portion 804 of the refrigerant 80 enters the second thermal expansion valve 18.

The first thermal expansion valve 16 is positioned downstream from the condenser 14. The first thermal expansion valve 16 is operable to decrease the pressure of the first portion 802 of the refrigerant 80, which vaporizes the first portion 802 of refrigerant 80 in liquid form to vapor form, which decreases the temperature of the first portion 802 of the refrigerant 80. The first thermal expansion valve 16 includes the pressure drop port 162 and the sensing port 164. The refrigerant 80 (first portion 802) flows from the condenser 14 and/or drier receiver (not shown), through the pressure drop port 162 of the first thermal expansion valve 16, to the heat exchanger 20 with low pressure and low temperature.

The heat exchanger 20 is coupled to the electrical component 72 (shown in FIG. 1) and is downstream from the first thermal expansion valve 16. The heat exchanger 20 is used to transfer heat from coolant 90 that came from the electrical component 72 to the refrigerant 80 (first portion 802). Then, the coolant 90 returns to the electrical components 72.

The heat exchanger 20 (battery cooler) includes the refrigerant path 202 and the coolant path 204. The coolant 90 is circulated between the battery unit 75 and the coolant path 204. Within the heat exchanger 20, the coolant 90 and the refrigerant 80 flow in the same direction, but in other implementations they can flow in the opposite directions.

In this implementation, the refrigerant 80 (first portion 802) flows from the heat exchanger 20, through the sensing port 164 of the first thermal expansion valve 16, to the control valve 30. The first thermal expansion valve 16 may be coupled to a thermometer to measure the temperature of the refrigerant 80 (first portion 802) flowing through the sensing port 164, to manage a flow control element such as an orifice in the pressure drop port 162 of the first thermal expansion valve 16.

The refrigerant 80 (first portion 802) flows to the control valve 30, which includes temperature logic in this implementation. A thermometer 40 coupled to the control valve 30 is configured to transmit a signal (electrical or mechanical) indicative of the temperature of the refrigerant 80 (first portion 802), to a control unit (not shown) that powers the control valve 30, shifting its positions 32 or 34. The control valve 30 is operable to determine if the refrigerant 80 (first portion 802) flowing from the heat exchanger 20 can be used to provide addition cooling in the evaporator 22 or if it should return to the compressor 12 based on the temperature of the first portion 802 after leaving the heat exchanger 20.

When the temperature of the refrigerant 80 (first portion 802) is higher or equal to a pre-determined value, the control valve 30 connects the first thermal expansion valve 16 and the compressor 12, as shown in the position 32. The refrigerant 80 (first portion 802) therefore flows back to the compressor 12. One example for the pre-determined value may be the boiling point of the refrigerant 80. At this temperature, the refrigerant 80 (first portion 802) flowing back to the compressor 12 is superheated. The heat exchanger 20, therefore, is connected in parallel to the evaporator 22. The refrigerant 80 (first portion 802) will not enter the evaporator 22 in this case.

When the temperature of the refrigerant 80 (first portion 802) is below the pre-determined value, the control valve 30 connects the first thermal expansion valve 16 and the evaporator 22, as shown in the position 34. The refrigerant 80 (first portion 802) from the control valve 30 has remaining cooling capacity and flows to the evaporator 22 to remove a heat via the evaporator 22. Because temperature of the refrigerant 80 (first portion 802) is below the pre-determined value, which is the boiling point of the refrigerant 80, for example, at least some of the refrigerant 80 (first portion 802) is in liquid form (saturated liquid). It can extract additional heat if it changes from liquid form to vapor form. The evaporator 22 may have an inlet manifold for the first portion 802 and the second portion 804 of the refrigerant 80, which absorbs heat via the evaporator 22 and then return to the compressor 12. The details of the evaporator 22 will be described later.

As previously described, the refrigerant 80 flowing from the condenser 14 is divided into the first portion 802 and the second portion 804 of the refrigerant 80. The second portion 804 of the refrigerant 80 enters the second thermal expansion valve 18.

The second thermal expansion valve 18 is downstream of the condenser 14 and is arranged in parallel to the first thermal expansion valve 16. The second thermal expansion valve 18 is operable to decrease the pressure of the refrigerant 80 (second portion 804), allowing the refrigerant 80 (second portion 804) to vaporize from liquid form and decrease the temperature of the refrigerant 80 (second portion 804). The second thermal expansion valve 18 includes the pressure drop port 182 and the sensing port 184. The refrigerant 80 (second portion 804) flows from the condenser 14 and/or drier receiver (not shown), through the pressure drop port 182 of the second thermal expansion valve 18, to the evaporator 22 with low pressure and low temperature.

The evaporator 22 has a first inlet 222, a second inlet 224, and an outlet 226. The first inlet 222 receives the refrigerant 80 (first portion 802) from the heat exchanger 20 through the control valve 30 when the control valve 30 determines that the first portion 802 of the refrigerant 80 flowing from the heat exchanger 20 has additional cooling capacity. The second inlet 224 is operable to receive the refrigerant 80 (second portion 804). The evaporator 22 transfers heat from a body of air to the refrigerant 80. Depending on the temperature of the refrigerant 80 (first portion 802), the refrigerant 80 (first portion 802) may flow to the evaporator to remove the heat also. The evaporator 22 may cool the cabin air, for example. Heat is transferred from the body of air to the refrigerant 80 due to its lower temperature (than cabin air) and/or its change from liquid form to vapor form that requires latent heat (energy potential). Again, the refrigerant 80 is discharged by the evaporator 22 through the outlet 226. It is noted that in this implementation, the refrigerant 80 (first portion 802 and second portion 804, or only second portion 804) may flow from the evaporator 22, through the sensing port 184 of the second thermal expansion valve 18, to the compressor 12. The second thermal expansion valve 18 may be coupled to a thermometer to measure the temperature of the refrigerant 80 (first portion 802 and second portion 804, or only second portion 804) flowing through the second port 184 to control manage a flow control element such as an orifice in the pressure drop port 182 of the second thermal expansion valve 18. For example, if the temperature of the refrigerant 80 (first portion 802 and second portion 804, or only second portion 804) from the evaporator 22 is too hot, the thermal expansion valve 18 will increase the flow rate of the refrigerant 80 (second portion 804) flowing into the evaporator 22. On the contrary, if the temperature of the refrigerant 80 (first portion 802 and second portion 804, or only second portion 804) from the evaporator 22 is colder than required, the second thermal expansion valve 18 will decrease the flow rate of the refrigerant 80 (second portion 804) flowing into the evaporator 22. The first portion 802 and the second portion 804 of the refrigerant 80, or the second portion 804 alone, return(s) to the compressor 12.

The parallel and parallel-series combination arrangement of the two phase cooling system 300 can operate parallel when the control valve 30 connects heat exchanger 20 and the compressor 12, and it can partly work as parallel, then in series, when the control valve 30 connects the heat exchanger 20 and the evaporator 22, depending on the condition of the refrigerant 80 (first portion 802) coming from the heat exchanger 20. The system refrigerant pressure is lower for parallel configuration than the series configuration. In this regard, the two-phase cooling system 300 can operate the compressor 12 more efficiently. The two-phase cooling system 300 uses an appropriate volume of the refrigerant 80 to successfully accept heat from via the heat exchanger 20 and the evaporator 22.

Figure 5:
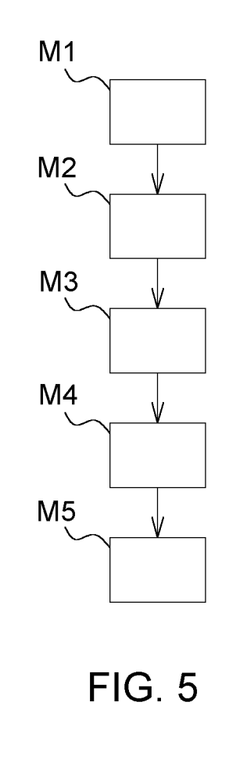
FIG. 5 is a flow chart showing a method of cooling a heat exchanger of a two-phase cooling system, which may have a parallel arrangement or a parallel and a parallel-series combination arrangement.

Referring to FIG. 5, a method for cooling a heat exchanger is provided. The heat exchanger is coupled to the electrical component of the electrical work vehicle, as described previously. The method includes the following steps.

Step M1: compressing a refrigerant in vapor form to increase pressure via a compressor.

Step M2: discharging a heat from the refrigerant flowing from the compressor to condense the refrigerant via a condenser.

Step M3: decreasing the pressure of the refrigerant to vaporize the refrigerant to vapor form from liquid form to decrease the temperature of the refrigerant via a first thermal expansion valve.

Step M4: accepting heat via a heat exchanger the refrigerant passes through.

Step M5: accepting heat via an evaporator the refrigerant passes through.

It is noted that if the method is applied to the two-phase cooling system 200 as shown in FIG. 3, the evaporator is positioned downstream from the heat exchanger. In this case, the refrigerant absorbs heat from the heat exchanger first, then the evaporator before returning to the compressor. In another implementation, the evaporator is positioned upstream from the heat exchanger.

Figure 6:
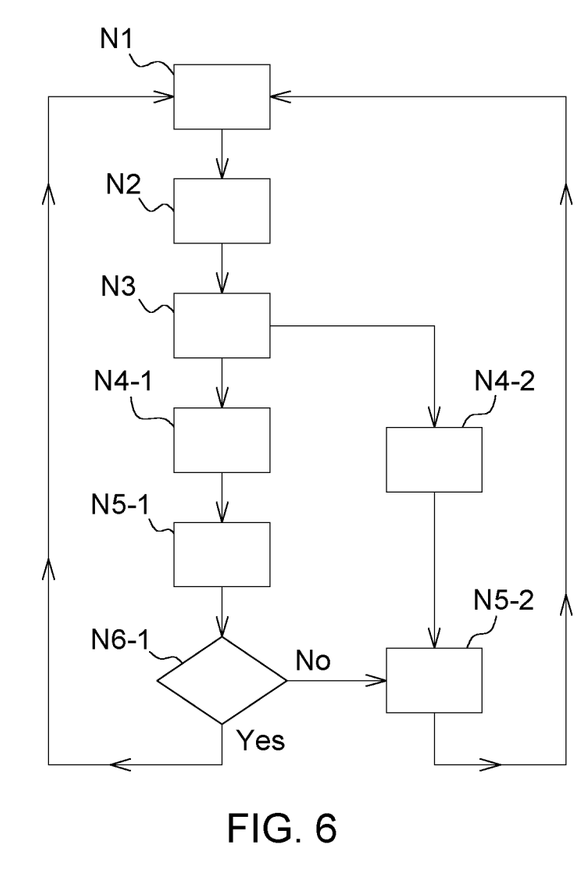
FIG. 6 is a flow chart showing the method of FIG. 5 in detail when the two-phase cooling system has the parallel-series combination arrangement.

However, if the method is applied to the two-phase cooling system 300 as shown in FIG. 4, which has a parallel and a parallel-series combination arrangement, the method is described in detail below. FIG. 6 is a flow chart showing an illustrative control of the two-phase cooling system having a parallel or a parallel-series operation based on the temperature of the refrigerant.

Step N1: compressing refrigerant in vapor form to increase its pressure via a compressor.

Step N2: discharging heat from the refrigerant flowing from the compressor. In one example, the temperature of refrigerant decrease to the point of condensation.

Step N3: dividing the refrigerant from the condenser. One portion of the refrigerant enters the first thermal expansion valve (go to Step N4-1) and the other portion of the refrigerant enters the second thermal expansion valve (go to Step N4-2).

Step N4-1: decreasing the pressure of the refrigerant to vaporize the refrigerant from liquid form to vapor form to decrease the temperature of the refrigerant via the first thermal expansion valve.

Step N5-1: absorbing heat via a heat exchanger that the refrigerant flows through.

Step N6-1: determining if the refrigerant should flow to one of the evaporator or the compressor based on the temperature of the refrigerant. A control valve is operable to determine whether the temperature of the refrigerant is higher or equal to a pre-determined value. If yes, the refrigerant flows back to the compressor (go to Step N1). If no, the refrigerant may still have cooling capacity and flows to the evaporator (go to Step N 5-2).

After Step N3, which describes the other portion of the refrigerant entering the second thermal expansion valve, Step N4-2 describes the refrigerant (the other portion) going through the vaporization process.

Step N4-2: decreasing the pressure of the refrigerant to vaporize the refrigerant in liquid form to decrease the temperature of the refrigerant via a second thermal expansion valve.

Step N5-2: accepting heat from an evaporator via the refrigerant flowing from the second thermal expansion valve. In Step N6-1, if the control valve determines the temperature of the refrigerant is below a pre-determined value from the heat exchanger, the refrigerant from the heat exchanger and the refrigerant from the second thermal expansion valve may combine together to accept heat via the evaporator. Then the refrigerant returns to the compressor.

Without in any way limiting the scope, interpretation, or application of the claims appearing below, a technical effect of one or more of the example implements disclosed herein is to cool the electrical component(s) that may need its temperature under the ambient temperature. Another technical effect of one or more of the example implementations disclosed herein is to adjust the flow rate of the refrigerant flowing to the heat exchanger and the evaporator, depending on the needs. Another technical effect of one or more of the example embodiments disclosed herein is to operate the compressor 12 more efficiently.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C)

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A two-phase cooling system of an electric work vehicle, comprising:
   a compressor operable to compress a refrigerant in vapor form to increase a pressure of the refrigerant;
   a condenser downstream of the compressor and operable to discharge a heat from the refrigerant flowing from the compressor to condense the refrigerant;
   a first thermal expansion valve downstream from the condenser and operable to decrease the pressure of the refrigerant to vaporize the refrigerant from liquid form to vapor form to decrease the temperature of the refrigerant;
   a heat exchanger coupled to an electrical component to transfer a heat from the electrical component to the refrigerant;
   an evaporator which the refrigerant passes through to accept a heat from an air; and
   a control valve operable to determine the refrigerant flow from the heat exchanger to one of the evaporator and the compressor based on the temperature of the refrigerant.

2. The two-phase cooling system of claim 1, wherein the heat exchanger is operable to cool a battery unit configured to power a motor of the electric work vehicle.

3. The two-phase cooling system of claim 1, wherein the evaporator is coupled to the heat exchanger and configured to receive the refrigerant from the heat exchanger.

4. The two-phase cooling system of claim 1, further comprising:
   a second thermal expansion valve downstream of the condenser and arranged parallel to the first thermal expansion valve and operable to decrease the pressure of the refrigerant to vaporize the refrigerant from liquid form to vapor form to decrease the temperature of the refrigerant; and
   wherein the evaporator is coupled to the second thermal expansion valve.

5. The two-phase cooling system of claim 1, wherein when the temperature of the refrigerant is higher or equal to a pre-determined value, the refrigerant flows back to the compressor.

6. The two-phase cooling system of claim 5, wherein the refrigerant flowing back to the compressor is superheated.

7. The two-phase cooling system of claim 1, wherein when the temperature of the refrigerant is below a pre-determined value, the refrigerant flows to the evaporator to accept additional heat.

8. The two-phase cooling system of claim 1, wherein the evaporator includes a first inlet operable to receive a first portion of the refrigerant from the heat exchanger through the control valve when the control valve determines the first portion of the refrigerant flowing from the heat exchanger returns to the evaporator and a second inlet operable to receive a second portion of the refrigerant.

9. The two-phase cooling system of claim 8, wherein the evaporator includes an outlet, and the first portion of the refrigerant and the second portion of the refrigerant combine within the evaporator such that the refrigerant flows out from the outlet of the evaporator.

10. The two-phase cooling system of claim 1, wherein the control valve includes a temperature logic.

11. A method of cooling a heat exchanger of a two-phase cooling system, comprising:
    compressing a refrigerant in vapor form to increase a pressure via a compressor;
    discharging of a heat from the refrigerant flowing from the compressor to liquidize at least a portion of the refrigerant via a condenser;
    decreasing the pressure of the refrigerant to vaporize the refrigerant from liquid form to vapor form and decrease the temperature of the refrigerant via a thermal expansion valve; and
    dissipating a heat of an electrical component of an electric work vehicle to the refrigerant flowing from the thermal expansion valve via a heat exchanger;
    transferring a heat from an air to the refrigerant via an evaporator; and
    determining the refrigerant flowing to one of the evaporator or the compressor based on the temperature of the refrigerant.

12. The method of cooling the heat exchanger of claim 11, wherein the heat exchanger is operable to cool a battery pack configured to power a motor of an electric work vehicle.

13. The method of cooling the heat exchanger of claim 11, wherein when the temperature of the refrigerant is higher or equal to a pre-determined value, the refrigerant flows back to the compressor.

14. The method of cooling the heat exchanger of claim 13, wherein the refrigerant flowing back to the compressor is superheated.

15. The method of cooling the heat exchanger of claim 11, wherein when the temperature of the refrigerant is below a pre-determined value, the refrigerant flows to the evaporator to absorb additional heat.

16. The method of cooling the heat exchanger of claim 11, wherein the refrigerant flowing to the evaporator is sub-cooled or in saturated liquid and vapor form.

* * * * *